United States Patent
Noda et al.

(10) Patent No.: US 12,147,477 B2
(45) Date of Patent: Nov. 19, 2024

(54) SEARCH RESULT DISPLAY DEVICE, SEARCH RESULT DISPLAY METHOD, AND NON-TRANSITORY COMPUTER READABLE RECORDING MEDIUM

(71) Applicant: NIPPON TELEGRAPH AND TELEPHONE CORPORATION, Tokyo (JP)

(72) Inventors: Yoshiaki Noda, Tokyo (JP); Setsuo Yamada, Tokyo (JP); Takaaki Hasegawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/268,577

(22) PCT Filed: Aug. 14, 2019

(86) PCT No.: PCT/JP2019/031937
§ 371 (c)(1),
(2) Date: Feb. 15, 2021

(87) PCT Pub. No.: WO2020/036194
PCT Pub. Date: Feb. 20, 2020

(65) Prior Publication Data
US 2021/0165831 A1    Jun. 3, 2021

(30) Foreign Application Priority Data

Aug. 15, 2018   (JP) ................ 2018-152900

(51) Int. Cl.
*G06F 16/9038*   (2019.01)
*G06F 16/903*   (2019.01)
*G06F 16/9032*   (2019.01)

(52) U.S. Cl.
CPC .... *G06F 16/9038* (2019.01); *G06F 16/90332* (2019.01); *G06F 16/90344* (2019.01)

(58) Field of Classification Search
CPC ......... G06F 16/90332; G06F 16/90344; G06F 16/9038; G06F 16/3329; G06F 16/355; G06F 16/35
See application file for complete search history.

(56) References Cited

U.S. PATENT DOCUMENTS

| | | | |
|---|---|---|---|
| 2004/0186712 A1* | 9/2004 | Coles ................. | G10L 15/26 704/235 |
| 2008/0201434 A1* | 8/2008 | Holmes ............... | H04L 51/04 709/206 |

(Continued)

FOREIGN PATENT DOCUMENTS

JP    2007323558    12/2007

*Primary Examiner* — Taelor Kim

(57) ABSTRACT

Disclosed is a search result display device (1) comprising: a regard prediction unit (12) configured to predict, from a dialogue between a customer and a service person, a regard of the customer; a keyword extraction unit (17) configured to extract a keyword from the regard; and a display controller (13) configured to cause a display (14) to display the dialogue and a search result obtained from the database (21) with the keyword as a search query, wherein when a string has been designated by the service person, the display controller (13) causes the display (14) to display a search result obtained from the database (21) using a search query that incorporates the string, until a search result automatic update instruction is given by the service person.

8 Claims, 8 Drawing Sheets

(56) References Cited

U.S. PATENT DOCUMENTS

| | | | |
|---|---|---|---|
| 2011/0307498 A1* | 12/2011 | McFarlane | G06F 16/951 707/751 |
| 2016/0358242 A1* | 12/2016 | Lagos | G06F 16/243 |
| 2018/0089289 A1* | 3/2018 | Zhang | G06F 16/9538 |
| 2019/0340200 A1* | 11/2019 | Coimbra | G06F 16/90332 |

* cited by examiner

SEARCH RESULT DISPLAY DEVICE, SEARCH RESULT DISPLAY METHOD, AND NON-TRANSITORY COMPUTER READABLE RECORDING MEDIUM

CROSS-REFERENCE TO RELATED APPLICATIONS

This application is a U.S. 371 Application of International Patent Application No. PCT/JP2019/031937, filed on 14 Aug. 2019, which application claims priority to and the benefit of JP Application No. 2018-152900, filed on 15 Aug. 2018, the disclosures of which are hereby incorporated herein by reference in their entireties.

TECHNICAL FIELD

The present invention relates to a search result display device, a search result display method, and program for displaying search results based on a database.

BACKGROUND

Conventionally, when an operator in a call center, a service person at a counter, and the like, are to respond to a customer, a search system to which the service person manually inputs keywords and question sentences and searches for an answer from a database in order to obtain information necessary for making a response, is used.

Further, in recent years, to assist the operator duties in a call center, a system providing functionality for real-time speech recognition of a call content and leveraging of natural language processing to automatically search for appropriate response-knowledge to display on a screen has been developed (see, e.g. NPL 1).

CITATION LIST

Non-Patent Literature

NPL 1: Seiji Kawamura and four others, "Utilization of AI at call centers", [online], February 2016, [Retrieved: May 14, 2018], Internet <URL:http://www.ntt.co.jp/journal/1602/files/jn201602035.pdf>.

SUMMARY

Technical Problem

According to the technology disclosed in NPL 1, question items that are expected beforehand and responses to these question items (FAQs) are registered in a database, and the FAQs are automatically searched to allow a novice service person who is not used to making answers, to dispense smooth answers in a manner similar to that of a veteran service person, thus improving customer satisfaction. Further, because the labor for seeking materials is eliminated, the response time can be shortened. However, in some cases it is not possible to automatically search for an intended FAQ.

An objective of the present invention, made in view of the abovementioned issues, is to provide a search result display device, a search result display method, and a program for displaying FAQs based on an FAQs resulting from an automatic search and instructions of a service person.

Solution to Problem

To solve the abovementioned problems, the search result display device relating to one embodiment is a search result display device configured to use a database in which documents are stored to display a search result of documents corresponding to the regard of the customer, the search result display device comprising: a regard extraction unit configured to predict and extract, from a dialogue between a customer and a service person, a regard of the customer; a keyword extraction unit configured to extract keywords from the regard; and a display controller configured to cause a display to display the dialogue and a search result obtained from the database with the keyword as a search query, wherein when a string has been designated by the service person, the display controller causes the display to display a search result obtained from the database using a search query that incorporates the string, until a search result automatic update instruction is given by the service person.

Further, to solve the abovementioned problems, the search result display device relating to one embodiment is a search result display device configured to use a database in which documents are stored to display a search result of documents, the search result display device comprising: a regard prediction unit configured to predict, from a dialogue between a customer and a service person, a regard of the customer; and a display controller configured to cause a display to display the dialogue and a search result obtained from the database with the regard as a search query, wherein when a string has been designated by the service person, the display controller causes the display to display a search result obtained from the database using a search query that incorporates the string, until a search result automatic update instruction is given by the service person.

Further, to solve the abovementioned problems, the search result display device relating to one embodiment is a search result display device configured to display a search result of documents, the search result display device comprising: an utterance display configured to display a speaker of utterances of a dialogue in a differentiated manner and display, the utterance indicating a regard of a customer from among the utterances in a differentiated manner; a keyword display configured to display a keyword extracted from the regard; a search result display configured to display a search result of the documents searched by using the keyword as a search query; and a search history console configured to accept operations for causing the search result display to display a search result searched based on past search queries.

Further, to solve the abovementioned problems, the search result display device relating to one embodiment is a search result display device configured to display a search result of documents, the search result display device comprising: an utterance display configured to display a speaker of utterances of a dialogue in a differentiated manner and display, regard utterances of a customer or regard confirmation utterances of a service person from among the utterances in a differentiated manner; a search result display configured to display a search result of the documents searched by using a search query comprising the regard utterance or the regard confirmation utterance; and a search history console configured to accept operations for causing the search result display to display a search result corresponding to the regard utterance or the regard confirmation utterance.

Further, to solve the abovementioned problems, the search result display method relating to one embodiment is a search result display method in a search result display device configured to use a database in which documents are stored to display a search result of documents corresponding to the regard of the customer, the method comprising: a regard extraction step for estimating, from a dialogue between a customer and a service person, a regard of the customer; a keyword extraction step for extracting keywords from the regard; and a display control step for causing a display to display the dialogue and a search result obtained from the database with the keyword as a search query, wherein when a string has been designated by the service person, the display control step causes the display to display a search result obtained from the database using a search query that incorporates the string, until a search result automatic update instruction is given by the service person.

Further, to solve the abovementioned problems, the search result display method relating to one embodiment is a search result display method in a search result display device configured to use a database in which documents are stored to display a search result of documents, the method comprising: a regard prediction step for estimating, from a dialogue between a customer and a service person, a regard of the customer; and a display control step for causing a display to display the dialogue and a search result obtained from the database with the regard as a search query, wherein when a string has been designated by the service person, the display controlling step causes the display to display a search result obtained from the database using a search query that incorporates the string, until a search result automatic update instruction is given by the service person.

Further, to solve the abovementioned problems, the search result display method relating to one embodiment is a search result display method in a search result display device configured to display a search result of documents, the method comprising: distinguishing and displaying speakers of utterances in a dialogue, and distinguishing and displaying a regard utterance of a customer or a regard confirmation utterance of a service person from among the utterances; displaying a keyword extracted from the regard utterance or the regard confirmation utterance; displaying a search result of the documents searched by using the keyword as a search query; and accepting an operation for causing display of a search result corresponding to the regard utterance or the regard confirmation utterance.

Further, to solve the abovementioned problems, the search result display method relating to one embodiment is a search result display method in a search result display device configured to display a search result of documents, the method comprising: distinguishing and displaying speakers of utterances in a dialogue, and distinguishing and displaying, a regard utterance of a customer or a regard confirmation utterance of a service person from among the utterances; displaying a search result of the documents searched by using the regard utterance or the regard confirmation utterance as a search query; accepting an operation for causing display of a search result corresponding to the regard utterance or the regard confirmation utterance.

Further, to solve the abovementioned problems, a program pertaining to one embodiment is configured to cause a computer to function as the abovementioned search result display device.

Advantageous Effect

According to the invention, FAQs based on FAQs resulting from an automatic search and instructions of a service person can be displayed. Further, the service person can easily perform operations for a FAQ search instruction, and can obtain intended FAQs in a shorter time.

DETAILED DESCRIPTION

Hereinafter, embodiments of the present invention will be described with reference to the drawings.

First Embodiment

Figure 1:
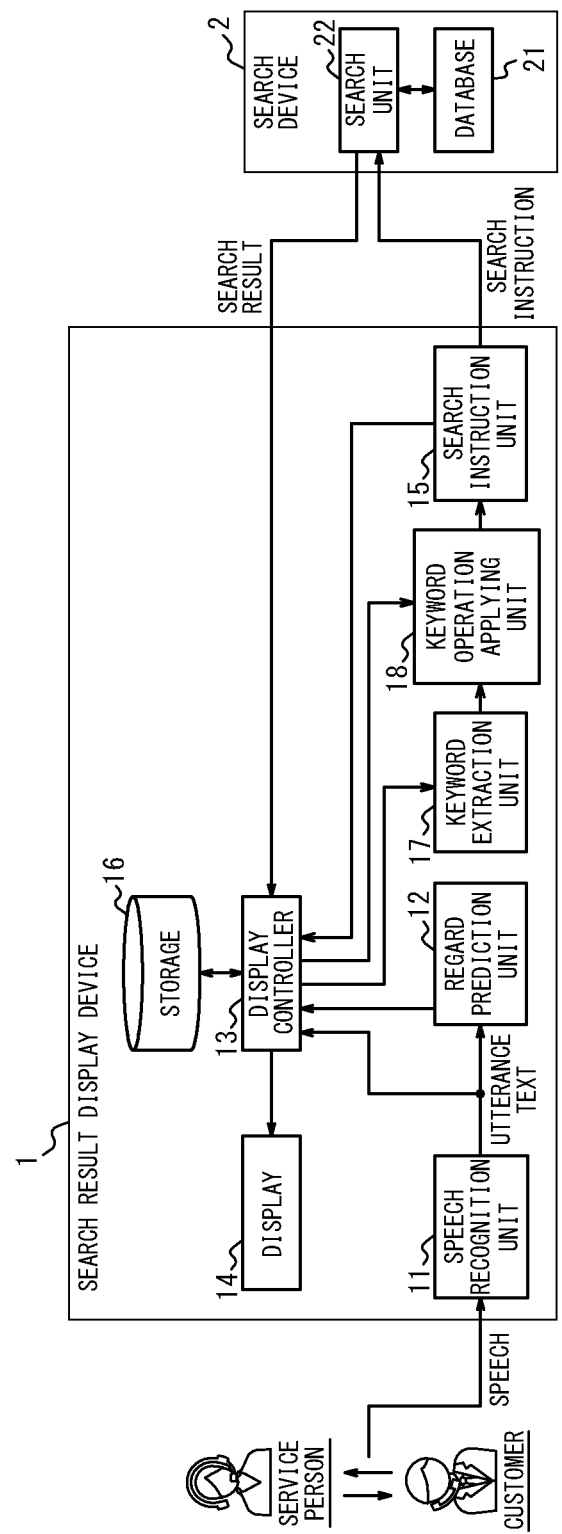
FIG. 1 is a block diagram showing an example configuration of a search result display device according to a first embodiment.

An example configuration of a search result display device according to the first embodiment is shown in FIG. 1. The search result display device 1 of FIG. 1 comprises a speech recognition unit 11, a regard prediction unit 12, a display controller 13, a display 14, a search instruction unit 15, a storage 16, a keyword extraction unit 17, and a keyword operation applier 18.

The search result display device 1 is a device that, when a service person receives an inquiry from a customer, searches and displays question items and responses corresponding to a regard of the customer in real-time. A representative example of the service person is an operator in a call center. The dialogue method need not be telephonic and may, for example, be via chat, in which case the speech recognition unit 11 becomes unnecessary, and text data is inputted into the regard prediction unit 12. In the present embodiment, a case in which servicing via telephone is performed is explained.

The speech recognition unit 11 inputs the voices of the customer and the service person in respective different channels (two channels). Then, the voices of the customer and the service person are each subjected to speech recognition processing, and utterance text (i.e., speech recognition results converted into text format data) are generated for each speech recognition unit, and are outputted to the regard prediction unit 12 and the display controller 13. The speech recognition unit 11 determines a silent interval in the voice and at the position corresponding to that silent interval, punctuation is appended to the speech recognition result. The speech recognition unit 11 can further estimate an end-of-talk of the utterances and, in this case, the end-of-talk unit of the utterances may be set as the speech recognition unit. Here, an error can occur during the speech recognition processing. Thus, processing using the N-best method for preparing multiple candidates for the recognition result by speech recognition processing of words included in the utterances may be performed.

The regard prediction unit 12 predicts the regard of the customer by estimating a regard utterance and a regard confirmation utterance from the utterance text. A regard utterance is an utterance by the customer that is intended to convey the regard of the inquiry. A regard confirmation utterance is an utterance by the service person that is intended to confirm the inquiry regard (e.g. a readback of the inquiry regard). As long as it is a dialogue, it does not matter whether the input media is voice or text. In the present embodiment, for the speech recognition results inputted from the speech recognition unit 11, it is predicted whether it is a regard utterance or a regard confirmation utterance by speech recognition unit, and a regard prediction result is outputted to the display controller 13, and it is stored in the storage 16. A speech recognition unit is a unit that the speech recognition unit 11 has deemed to be one chunk. In the servicing of customers, in general, immediately after the customer has made an utterance corresponding to the regard (regard utterance), the service person makes a confirmation by repeating the regard. The regard prediction unit 12 can leverage such a dialogue structure. For example, in a case in which the customer makes the regard utterance "After having set the usage setting to use the foreign currency deposit dialogue, can it be used immediately?", the service person makes the regard confirmation utterance "You would like to know whether the dialogue can be used immediately when you have activated the foreign currency deposit; is that right?". By leveraging such a dialogue structure, in a case in which the utterance of the service person terminates with a "__ is that right?" or a "__ is that so?", it can be predicted that the utterance of that customer or the utterance of that service person is that regard. Further, in a case in which the utterance of the service person includes in a lead portion a phrase like "The content of your question relates to __." that explicitly indicates the regard, that utterance can be predicted as the regard.

The keyword extraction unit 17, with regard to the regard (regard utterance and regard confirmation utterance), performs selection based on whitelisting or part-of-speech analysis on words that are extracted using methods such as morphological analysis or speech recognition result word stringing, and further performing deletion based on blacklisting, and as a result extracts the remaining words as keywords and outputs them to the keyword operation applier 18. Further, in a case in which an utterance by the service person is selected, the keyword extraction unit 17 also extracts, with respect to the selected utterance, keywords in a similar manner. In a case in which an utterance is deselected by the service person, keyword extraction is not performed on the deselected utterance.

In a case in which there was a keyword selection or deselection by the service person, the keyword operation applier 18 performs, for the keyword extracted by the keyword extraction unit 17, an addition of the selected keyword and a deletion of the deselected keyword, and outputs these to the search instruction unit 15. Moreover, in a case in which there is neither a keyword selection nor deselection by the service person, the keywords inputted from the keyword extraction unit 17 are outputted, as-is, to the search instruction unit 15.

Each time a regard is predicted by the regard prediction unit 12, the search instruction unit 15 integrates the keywords inputted from the keyword operation applier 18, generates a search query, and transmits an FAQ search instruction including that search query to the search device 2. That is, the search query is generated with account to the selection/deselection of utterances and the selection/deselection of keywords. Further, the search instruction unit 15 outputs the generated search query to the display controller 13.

The search device 2 comprises a database 21 and a search unit 22. Moreover, though, in the present embodiment, the search device 2 is described as a device independent from the search result display device 1, the search result display device 1 may internally possess the functionality of the search device 2. That is, the search result display device 1 may also be configured to comprise the database 21 and the search unit 22.

The database 21 stores anticipated question items and answers to these question items (FAQ) in advance. Further, the database 21 associates and stores related words for each answer to the question items.

The search unit 22, upon receiving FAQ search instructions including a search query from the search instruction unit 15, searches the question items or the answers corresponding to the search query from the database 21 using any known technique, and transmits the search result to the display controller 13. Here, a question item or an answer corresponding to the search query is a question item or an answer that is predicted to be similar to the content of the search query, and there may be a plurality of question items or answers to be searched for a single search query. Further, in addition to the search result, the search unit 22 may transmit the search query used by the search unit 22 for the search to the display controller 13.

For example, the search unit 22 may treat a search query as a set of keywords and, via techniques such as keyword matching or conceptual searching, search for question items or answers most similar to the search query. Further, increasing the search accuracy may entail: setting the word included in the regard, of the combination out of the combination of the words included in the search query and the words included in the question items or answers, with the highest similarity, as the first keyword; setting the word included in the question items or answers as the second keyword; calculating at least two of the similarities included in the group consisting of: the similarity between keywords; the similarity between the clauses including the keywords; and the similarity between the dependency of the clauses including the keywords, wherein the search query and the question item or answer are evaluated as more similar when the absolute value of the value of change of the at least two similarities are smaller; and searching the question item or answer having the highest similarity with the search query. Further, increasing the search accuracy may entail having the search unit 22 perform the likes of: deletion of the words determined to be unnecessary for the search (e.g. words frequently occurring in the FAQ and words that cause a failed search) from the search query received from the search instruction unit 15, wherein the lack of necessity is determined based on the likes of FAQ stored in the database 21, externally conferred words, and word-statistical-information; and addition or substitution, to the search query, of words determined to be necessary for the search (e.g. equivalent terms and synonyms used in the FAQ), to modify the search query received in accordance with the FAQ stored in the database 21, and then a search may be performed using the modified search query, and this process may be performed based on the word-statistical-information that the search instruction unit 15 received from the search unit 22. In a case in which the query generated by the search instruction unit 15 and the search query of the search unit 22 differ, the display 14 may comprise a search query display for displays the search query in the keyword display 142.

The display controller 13 causes the display 14 to display the content of the dialogue between the customer and the service person (in this embodiment, the speech recognition result obtained from the speech recognition unit 11). Further, the display controller 13 obtains the FAQ of the search result from the database 21, and causes the display 14 to display it. Moreover, the display controller 13 may also cause the display 14 to display, among the speech recognition results, the regard predicted by the regard prediction unit 12, in a manner that allows differentiation from other speech recognition results.

Further, in a case in which an utterance was selected or deselected by the service person, the utterance (selected/deselected utterance) selected or deselected by the service person is stored in the storage 16. Further, in a case in which a keyword was selected or deselected by the service person, the keyword (selected/deselected keyword) selected or deselected by the service person is stored in the storage 16. Then, the display controller 13 obtains, from the database 21, the question items and the FAQ for those question items that correspond to the search query that incorporates the selected/deselected utterances and the selected/deselected keywords, and causes the display 14 to display these for a period until a search result automatic update instruction is given by the service person. Specific examples of the selected/deselected utterances and the selected/deselected keywords are discussed below.

When automatically extracting the regard (regard utterances and regard confirmation utterances), an ID (hereinafter, "history ID") for each regard is appended for history management purposes, and the storage 16 manages user operations and search results for each history ID. For extraction of a new regard utterance, a new history ID is appended, and is managed as a separate history. Moreover, in a case in which the search result is zero cases, it need not be saved as a history. The storage 16 stores the regard and the history ID as a pair with the search result.

The regard prediction unit 12, regardless of the existence of a designation of selected/deselected utterances and selected/deselected keywords, continues with regard prediction until the dialogue between the customer and the service person terminates, and the display controller 13, in a case in which the search result automatic update instruction is given by the service person, causes the display 14 to display the FAQ corresponding to the final regard that has been predicted by the regard prediction unit 12.

Further, the display controller 13 can obtain a keyword from the keyword extraction unit 17, and cause the display 14 to display it as a highlighted keyword in a selectable manner. Further, a keyword can be obtained from an utterance that was not determined by the keyword extraction unit 17 to be the regard, and the display 14 can be caused to display it as a highlighted keyword in a selectable manner. Further, in addition to the utterances of the customer and the service person, and the FAQ which is the search result, the display controller 13 can cause the search query that the search device 2 has been instructed to search to be displayed. Alternatively, in order to know the search query actually used by the service person for the search, instead of the search query that was instructed for search, the display controller 13 can obtain the search query actually used by the search device 2 along with the search result, and can cause the display 14 to display it instead of the search query that was instructed for search.

The display 14 is a display that displays data inputted from the display controller 13. Moreover, though, in the present embodiment, the search result display device 1 is configured as having the display 14, the display 14 may be a device independent of the search result display device 1.

The display 14 displays speech recognition results inputted from the speech recognition unit 11 and data inputted from the display controller 13. The display 14 can, along with the search result, accept and display, as input from the display controller 13, inputs such as the search query that the search device 2 has been instructed to search and the search query actually used by the search device 2.

In a case in which the service person (user) performs an operation such as a click on an object such as a button or icon, the display 14 notifies the operation content to the display controller 13.

Figure 2:
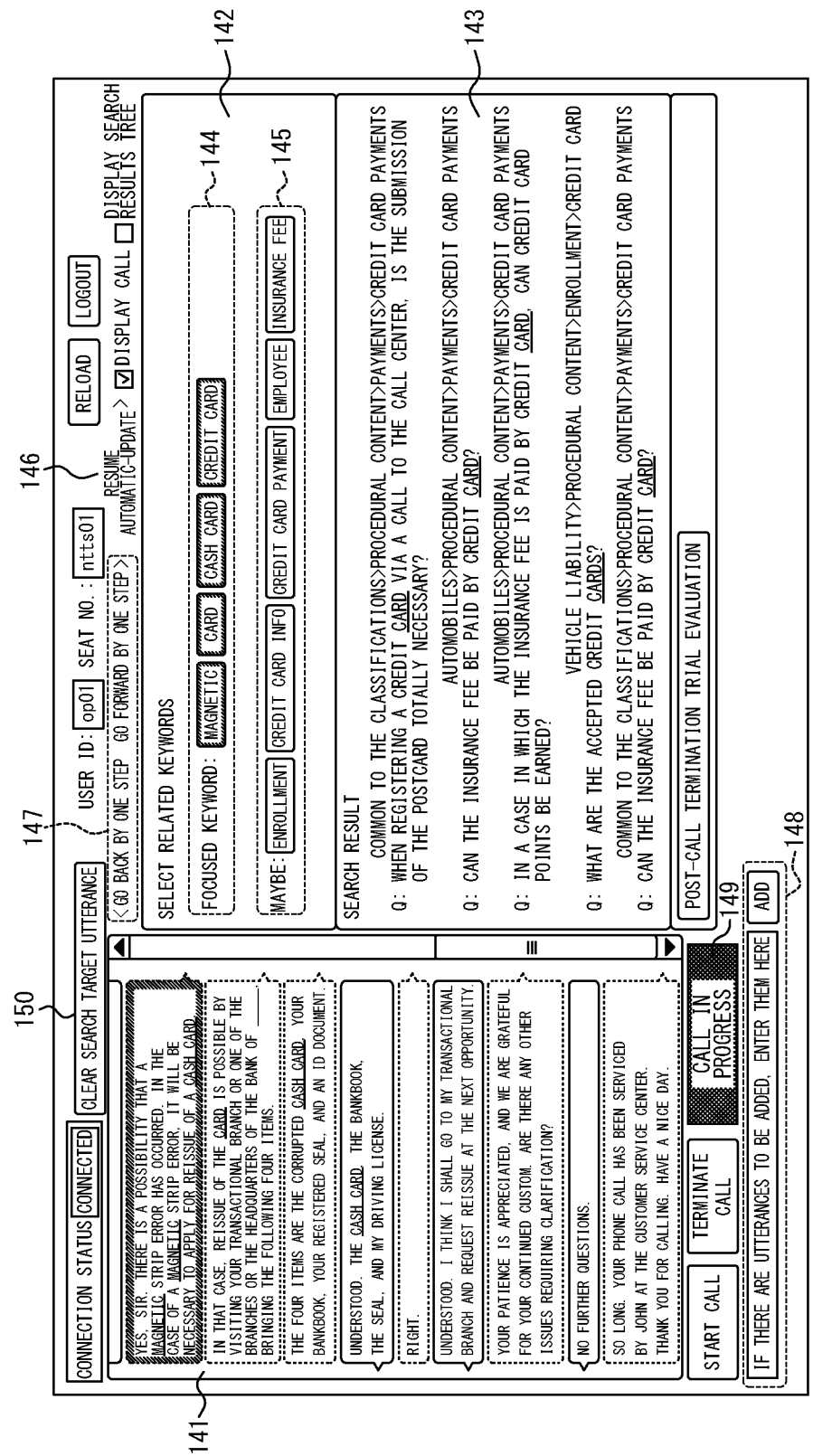
FIG. 2 is a diagram showing an example of a display form of a display in a search result display device according to the first embodiment.

A specific example regarding the display form of the display 14 is shown in FIG. 2. The form displayed by the display 14 includes an utterance display 141, a keyword display 142, a search result display 143, a display mode console 146, a search history console 147, an utterance text additional input interface 148, and a dialogue status display 149. The keyword display 142 includes a focused keyword display 144 and a related keyword display 145.

The utterance display 141 displays the dialogue content, for each utterance unit (e.g. for each speech recognition unit), sequential text in real-time. The utterance display 141 displays the speakers of the utterances of the dialogue in a differentiated manner. Though in FIG. 2, the speech recognition result of the customer is shown in speech balloons drawn in solid lines with stems on the left, and the speech recognition result of the service person is shown in speech balloons drawn in dotted lines with stems on the right, other methods such as using differing background colors may be used for differentiation. Further, the utterance display 141 displays the keywords obtained from the keyword extraction unit 17 in a manner that is differentiated from other terms. Though in FIG. 2, differentiation with respect to other terms is done be underlining the keywords, other methods such as highlighting the display and changing color and font-weight with respect to other terms may also be done for differentiation. Hereinafter, a keyword displayed in the utterance display 141 is referred to as a "highlighted keyword". Further, the utterance display 141 may display an utterance unit determined to be a regard utterance in a manner that allows differentiation from other utterance units using methods such as changing the background color from that of the other utterances.

The keyword display 142 displays keywords related to the utterance indicating the regard of the customer. For example, the search query used for the FAQ search is displayed in the "focused keyword:" field of the focused keyword display 144. Further, words obtained by eliminating keywords displayed in the focused keyword display 144 from the related words stored in the database 21 are displayed in the "maybe:" field of the related keyword display 145. In a case in which the query that was instructed to be searched and the search query of the search unit 22 differ, a search query display for displaying the search query in the keyword display 142 can be provided.

The search result display 143 displays the search results corresponding to the regard searched by the search unit 2 in accordance with the search query. The search result is, for example, a document (FAQ). Further, as to the search result, the whole text of the answer or a summary of the answer can be directly displayed immediately below of the question item, or, as shown in FIG. 2, the question item alone can be displayed, and the answer to it can be displayed indirectly by clicking on the question item. Further, in a case in which a plurality of question items corresponding to the regard are searched, all of them can be displayed or a predetermined number of them can be shown in descending order of the degree to which the items agree with the regard. Further, the search result display 143 may, as shown in FIG. 2, display the searched FAQ category or can display a string corresponding to the focused keyword in a manner that is differentiated from the other strings, such as by underlining. Because the speech recognition by the speech recognition unit 11 and the regard prediction by the regard prediction unit 12 are performed in real-time, each time a regard is predicted, the keyword to be displayed in the keyword display 142 and the search result to be displayed in the search result display 143 are updated.

In the example given in FIG. 2, the speech recognition unit "Yes, sir. Probably, there is a possibility that a magnetic strip error as occurred. In the case of a magnetic strip error, it will be necessary to apply for reissue of a cash card." is predicted by the regard prediction unit 12 as a regard, and the question items corresponding to the regard are displayed in the search result display 143. Further, the search queries "magnetic" and "cash card" are displayed, as focused keywords, in the keyword display 142.

The service person can manually decide whether the terms displayed in the focused keyword display 144 (hereinafter, "focused keywords") and the terms displayed in the related keyword display 145 (hereinafter, "related keywords") are to be selected (adopted) as a search query by clicking on them. That is, in the beginning all the focused keywords are in a selected state and by clicking on them later on they can be individually deselected, and in the beginning all the related keywords are in a deselected state and by clicking on them later on they can be individually selected. In a case in which a related keyword is selected, that related keyword can be deleted from the related keyword display 145, and it can be added to the focused keyword display 144.

Though the automatically searched FAQ is displayed in the search result display 143, in a case in which the intended FAQ has not been displayed, the service person can change the search query used for the automatic search by manually selecting/deselecting utterances and manually selecting/deselecting keywords, and by doing so can change the search query used for the automatic search. In the specification, in order to distinguish from an automatic search in which a FAQ search is performed without manual operation, a search involving manual operation such as the above shall be referred to as a "non-automatic search". That is, a non-automatic search is triggered by a manual operation.

According to a first method of non-automatic search, the service person selects or deselects keywords (terms identified as focused keywords or related keywords) from the keyword display 142 using click operations and the like. When a keyword is selected or deselected from the display of the keyword display 142, the display 14 outputs the selected or deselected keyword to the display controller 13. The display controller 13 outputs the selected or deselected keyword to the keyword operation applier 18. The keyword operation applier 18, for the keywords extracted by the keyword extraction unit 17, performs addition of the selected keywords and deletion of the deselected keywords, and outputs this to the search instruction unit 15. The search instruction unit 15 integrates the keywords inputted from the keyword operation applier 18 and generates a search query, and transmits a FAQ search instruction including the search query to the search device 2. The display controller 13 obtains, from the search device 2, question items resulting from the search, based on the search query, and answers to those question items, and causes the display 14 to display these as the FAQ search results. In a case in which the regard prediction unit 12 did not correctly predict the regard, or in a case in which the spoken regard utterance alone is insufficient for the FAQ search, because the focused keywords and related keywords up until then are displayed in the keyword display 142, the service person can readily perform a non-automatic search.

According to a second method of non-automatic search, the service person selects, using a click operation or the like, the utterances of the subject for which a search is desired, from the utterances displayed in the utterance display 141 (e.g. a set of speech recognition units). Alternatively, an utterance that is displayed in a differentiated manner as a selected utterance in the utterance display 141 is deselected. When an utterance unit is selected or deselected from the utterance display 141, the display 14 outputs the selected or deselected utterance to the display controller 13. The display controller 13 outputs the selected or deselected utterance to the keyword extraction unit 17. The keyword extraction unit 17 adds a keyword by extracting the keyword from the selected utterance, and deletes a keyword already extracted from the deselected utterance, and outputs the modified keywords to the keyword operation applier 18. The keyword operation applier 18 applies the selection/deselection of keywords by the service person up to this point, and outputs to the search instruction unit 15. The search instruction unit 15 integrates the keywords inputted from the keyword operation applier 18, generates a search query, and transmits an FAQ search instruction including the search query to the search device 2. The display controller 13 obtains, from the search device 2, question items resulting from the search, based on the search query, and the answers to those question items, and causes the display 14 to display these as the FAQ search results. In a case in which the regard prediction unit 12 did not correctly predict the regard, or in a case in which the spoken regard utterance alone is insufficient for the FAQ search, because the utterances are displayed in real-time in the utterance display 141, the service person can readily perform a non-automatic search by merely selecting an utterance.

According to a third method of non-automatic search, the service person inputs an added utterance to the "If there are utterances to be added, enter them here" field of the utterance text additional input interface 148, as text, and depresses the add button. The display 14 adds the text that has been inputted (inputted text) into the utterance display 141, and said text transitions into a selected state. Then, the display 14 outputs the currently selected utterance to the display controller 13. The display controller 13 outputs all the selected utterances to the keyword extraction unit 17. The keyword extraction unit 17 extracts keywords from the selected utterances, and outputs to the keyword operation applier 18. The keyword operation applier 18 applies the selection/deselection of keywords by the service person up to this point, and outputs to the search instruction unit 15. The search instruction unit 15 transmits the FAQ search instruction including the search query to the search device 2. The display controller 13 obtains, from the search device 2, the question items resulting from the search, based on the search query, and the answers to those question items, and causes the display 14 to display these as the FAQ search results. By doing so, the service person incorporates unspoken aspects that have not been voiced as an utterance text input, in the search.

According to a fourth method of non-automatic search, the service person determines the regard from the utterances displayed in the utterance display 141 (e.g. a set of speech recognition units) and selects, using a click operations or the like, highlighted keywords included in the speech recognition unit determined to be the regard. When a searchable term is selected from the display of the utterance display 141, the display 14 outputs the selected highlighted keyword to the display controller 13. The display controller 13 outputs the selected highlighted keyword to the keyword operation applier 18. The keyword operation applier 18, performs addition of the selected keywords to the keywords extracted by the keyword extraction unit 17, and outputs to the search instruction unit 15. The search instruction unit 15 integrates the keywords inputted from the keyword operation applier 18 and generates a search query, and transmits a FAQ search instruction including the search query to the search device 2. The display controller 13 obtains, from the search device 2, question items resulting from the search, based on the search query, and answers to those question items, and causes the display 14 to display these as the FAQ search results. Even in a case in which the regard prediction unit 12 could not predict the regard, the utterances are displayed in real-time in the utterance display 141, and as the highlighted keywords are displayed in a manner differentiated from the other terms, the service person can readily perform a non-automatic search. Moreover, when the highlighted keyword is selected, the display controller 13 can additionally display the selected highlighted keyword in the "focused keyword:" field.

In the abovementioned first to fourth methods of non-automatic search, a plurality of utterances or keywords can be chosen. For example, in a case in which "cash card" is selected from "focused keyword:" and "employee" is selected from "maybe:", the display controller 13 outputs "cash card" and "employee" to the keyword operation applier 18. Further, in a case in which the first and fourth methods are combined and "cash card" is selected from "focused keyword:" and "reissue" is selected from the highlighted keywords, the display controller 13 outputs "cash card" and "reissue" to the keyword operation applier 18.

Moreover, in a case in which utterance or keyword selections/deselections are consecutively performed, instead of doing FAQ searches for each of the utterance or keyword selections/deselections, performing aggregated searching is better in terms of efficiently performing FAQ searches. For this, in a case in which, after a first utterance or a keyword has been selected/deselected, and in which a second utterance or a keyword has not been selected/deselected within a prescribed guard time (e.g. 1 second), the display controller 13 outputs the first utterance or the keyword to the keyword extraction unit 17 or the keyword operation applier 18. In a case in which a second utterance or keyword is selected/deselected within the guard time, waiting of the guard time is repeated, and in a case in which a third utterance or keyword is not selected/deselected within the guard time, the first utterance or keyword and the second utterance or keyword are outputted to the keyword extraction unit 17 or the keyword operation applier 18.

For the utterance display 141, the display is updated by utterance unit (e.g. speech recognition unit), but for the keyword display 142 and the search result display 143, the display is updated each time an automatic search is performed (i.e. each time the regard is predicted by the regard prediction unit 12).

On the other hand, when a non-automatic search is performed via the selection/deselection of an utterance or the selection/deselection of a keyword, the display controller 13 causes the focused keyword display 144 to display a new search query, and the display controller 13 obtains a new FAQ corresponding to the new search query from the search device, and causes the search result display 143 to display it. Further, in a case in which an utterance displayed in the utterance display 141 is selected, the display controller 13 further causes the selected utterance to be displayed in a manner different from other utterances. Further, in a case in which text is inputted into the utterance text additional input interface 148, the display controller 13 further causes the inputted text to be displayed immediately following the newest utterance of the utterance display 141, and that additional utterance is displayed in a selected state.

When a non-automatic search is performed, in order to prevent the search result from being unintentionally updated by an automatic search, the mode is transitioned into an automatic-update-off mode. Further, upon having transitioned into the automatic-update-off mode, the utterance display 141 also stops automatic scrolling that was being performed until then for displaying the newest utterance. Thereafter, when a "resume automatic update" button shown in display mode console 146 is clicked, the resume automatic update instruction is passed to the display controller 13 and the mode transitions into an automatic-update-on mode, and the display controller 13 causes the display 14 to display the newest automatic search result. That is, in a case in which the display mode console 146 has accepted a modification instruction leading to the automatic-update-on mode, the search result display 143, before transitioning to the automatic-update-on mode, displays the search result of the documents corresponding to the newest regard utterance or regard confirmation utterance last stored in the storage 16. Further, upon transitioning to the automatic-update-on mode, in order to ensure that the newest utterance will always be displayed on the screen, the utterance display 141 starts the automatic scroll.

When a non-automatic search is performed, the display mode console 146 accepts a modification instruction for switching from the automatic-update-on mode (i.e. a mode in which timely update and storing of the search result of the FAQ via automatic searching is performed, and in which the search result display 143 is caused to display this) to the automatic-update-off mode. The display mode console 146 may further accept a modification instruction for switching from the automatic-update-on mode to a mode in which the search result of the FAQ via automatic search is not automatically updated (automatic-update-off mode).

In a case in which a non-automatic-search is performed, the display mode console 146 displays that it is in the automatic-update-off mode. For example, for the automatic-update-off mode, a button labeled "resume automatic update" is displayed, and by clicking on that button, switching to the automatic-update-on mode can be realized. Further, for the automatic-update-on mode, a button labeled "stop automatic update" is displayed, and by clicking on that button, switching to the automatic-update-off mode can be realized.

In the automatic-update-on mode, the newest FAQ search results that have been automatically searched are displayed one after another. In the automatic-update-off mode, until the automatic-update-on mode is invoked by the service person depressing the "resume automatic update" button, the form is not automatically updated and the operation of the service person is awaited. That is, once the automatic-update-off mode is invoked, unless the "resume automatic update" button is depressed, the automatic-update-on mode is not invoked. With regard to going from the automatic-update-on mode to the automatic-update-off mode, in order to prevent unintended updates of the automatic search results during the operations of the service person, in addition to a button operation, switching may occur even in a case in which non-automatic-search is performed. Further, even for a case in which a question item is selected in the search result display 143 and an answer is displayed, switching from the automatic-update-on mode to the automatic-update-off mode occurs.

The search history console 147 accepts an operation for instructing display of a search history based on past search queries (e.g. the FAQ search results, the keyword selection status and the utterance selection status, the scroll position of the regard utterances or regard confirmation utterances corresponding to the automatic search being displayed in the utterance display 141, and the like). For example, when a "go back by one step" button is clicked, a display reversion instruction is passed to the display controller 13, and the display controller 13 causes the display 14 to display the search history having a search ID that is one step prior to the presently displayed search history and, for the utterance display 141, the display is reverted to the recorded scroll position. Further, when a "go forward by one step" button is clicked, a display advancement instruction is passed to the display controller 13, and the display controller 13 causes the display 14 to display the search history having a search ID that is one step later than the presently displayed search history and, for the utterance display 141, the display is reverted to the recorded scroll position. In cases in which these operations are performed, the automatic update-off mode is also invoked.

As has been explained above for the third method of non-automatic search, the utterance text additional input interface 148 accepts additional input of utterance text.

The dialogue status display 149 shows whether a dialogue is in progress. For example, if a dialogue is currently in progress, "call in progress" is displayed.

The storage 16 stores a history of the FAQ search status in order to allow operations by the abovementioned display mode console 146 and the search history console 147. Even for the case in which a non-automatic search is performed, the storage 16 stores the history of the FAQ search status.

Figure 3:
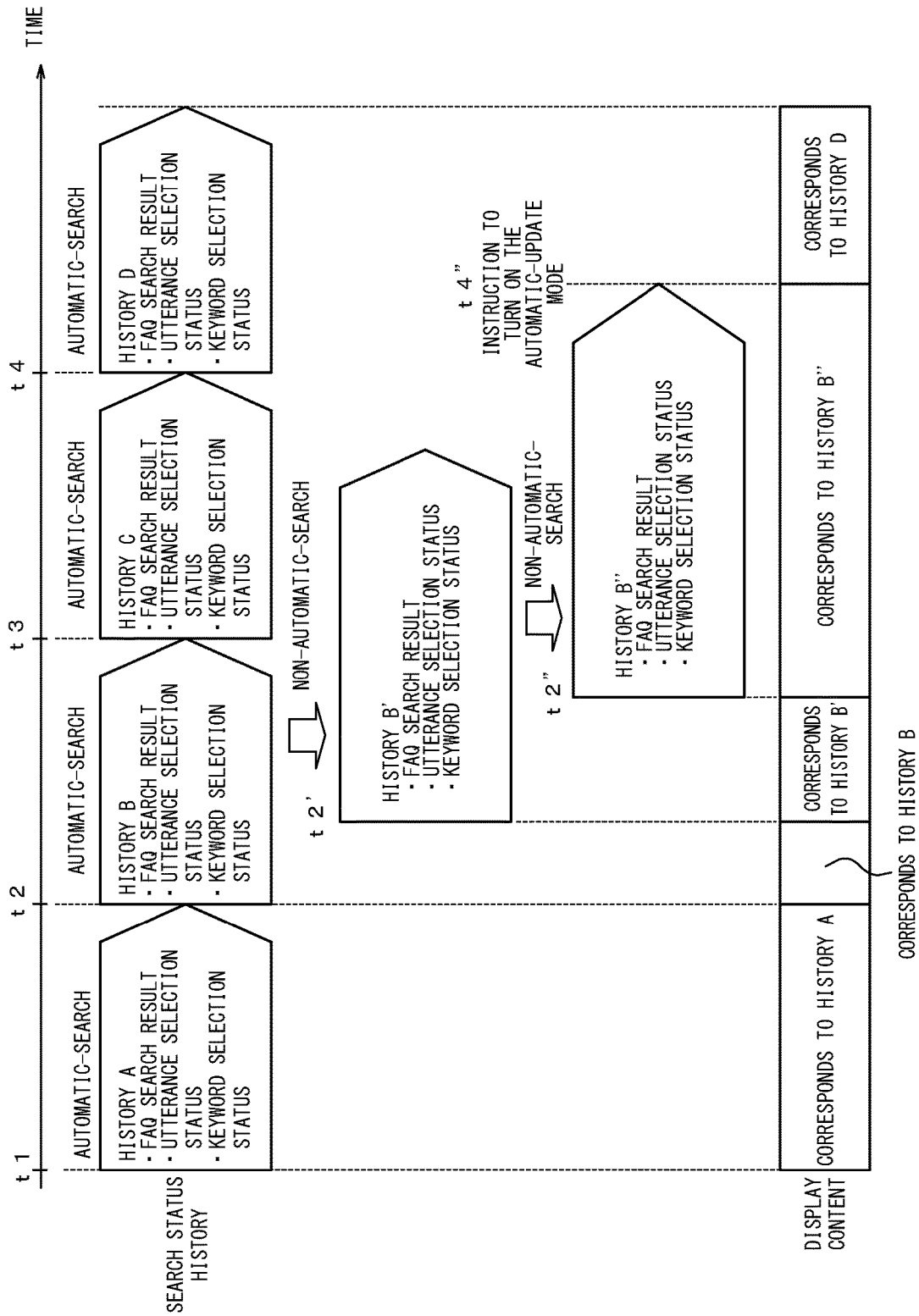
FIG. 3 is a diagram explaining a history of a search status for the search result display device according to the first embodiment.

FIG. 3 is a diagram explaining the history of the FAQ search status to be stored in the storage 16. Each time a regard is predicted by the regard prediction unit 12, the search instruction unit 15 transmits a FAQ search instruction including that regard to the search device 2, the display controller 13 obtains from the search device 2 a FAQ corresponding to that regard, and a history ID is appended for each regard for the purpose of history management, and it is stored in the storage 16. Further, the display controller 13 stores in the storage 16 a keyword selection status showing which keyword on the form is selected. If a non-automatic search is not performed, all the words included in the regard (i.e. the "focused keyword:" of FIG. 2), out of the keywords correlated to the question item corresponding to the regard, are selected. Further, the display controller 13 stores in the storage 16 an utterance selection status showing which utterance unit is selected.

As shown in FIG. 3, when an automatic search is performed at times t1, t2, t3, and t4, the display controller 13 generates sequentially, for the search status, histories A, B, C, and D, and different history IDs are appended for each and stored in the storage 16. On the other hand, if, during the display of the FAQ search result corresponding to the history B, a non-automatic search is performed by the operation of the service person, the automatic update-off mode is invoked, a new search is performed and the display controller 13 generates a history B'. In a case in which a non-automatic search is performed, because the service person has determined that the FAQ search pertaining to the history B is not appropriate, the storage 16 discards history B and stores the history B' (i.e. the history B is overwritten with history B'). Further, when, at the time t2", a non-automatic search is performed by the operation of the service person, the display controller 13 generates a history B", and the storage 16 discards the history B' and stores the history B" (i.e. the history B' is overwritten with the history B"). For the non-automatic search, in addition to the FAQ search result, the keyword selection status, and the utterance selection status, information of the scroll position displayed in utterance display 141 is used for the overwriting of the search history.

In the example shown in FIG. 3, as the non-automatic search is not performed during the interval from the time t1 to the time t2, the display 14 displays the FAQ search result corresponding to the history A. Though, when it becomes time t2, the display 14 provides a display corresponding to the history B, a switch to a display corresponding to the history B' occurs at the time t2' at when the first non-automatic search was performed, and a switch to a display corresponding to the history B" occurs at the time t2" at when the second non-automatic search was performed. Thereafter, at the time t4", when an instruction for turning on the automatic update mode is given by the operation of the service person leading to a clicking on the button named "resume automatic update", the display 14 switches to the newest history at that time which is the display corresponding to the history D. That is, in FIG. 3, the history C is not displayed on the form as the automatic update is in an off-mode; however, the automatic search result always entail an action in which new histories are added.

In the example shown in FIG. 3, the histories A, B, C, and D are stored. Thus, after the display 14 has provided a display corresponding to the history D by being given an automatic update resumption instruction, if the "go back by one step" button is clicked to provide the display reversion instruction, the display 14 provides a display corresponding to the history C. Further, when the button named "go back by one step" is clicked, the display 14 provides a display corresponding to the history B", and when the button named "go back by one step" is further clicked, the display 14 provides a display corresponding to the history A. In a case in which a non-automatic search is performed in a situation in which a display corresponding to the history A is being provided, the history A is replaced by the history A' taking such aspects as those utterance selection statuses or keyword selection statuses or FAQ search results. Similarly, in a case in which the button named "go forward by one step" is clicked, the display 14 provides display corresponding to the history that is advanced by one step. Further, as a variant of a search using the selection/deselection of the non-automatic search of the service person, a search may be performed in which the selection/deselection status of the utterances and keywords and the like of the service person stored in the history B' of the time t2' are applied not only to the history B" but also to the time of the next automatic search (corresponding to the history C). Above, a method which, in the case of a non-automatic search, replaces or overwrites the history without retaining the that search history has been explained but in a case in which it is desired that a history of the non-automatic search is retained, a method in which a new history ID correlated to the basic automatic search result is recorded can be adopted.

The display 14 can recall a past dialogue and display it. In this case, the display 14 provides a display corresponding to the history that is stored last in the storage 16 for that dialogue. Moreover, the dialogue may also, from the beginning, be traced in real-time.

(Search Result Display Method)

Figure 4:
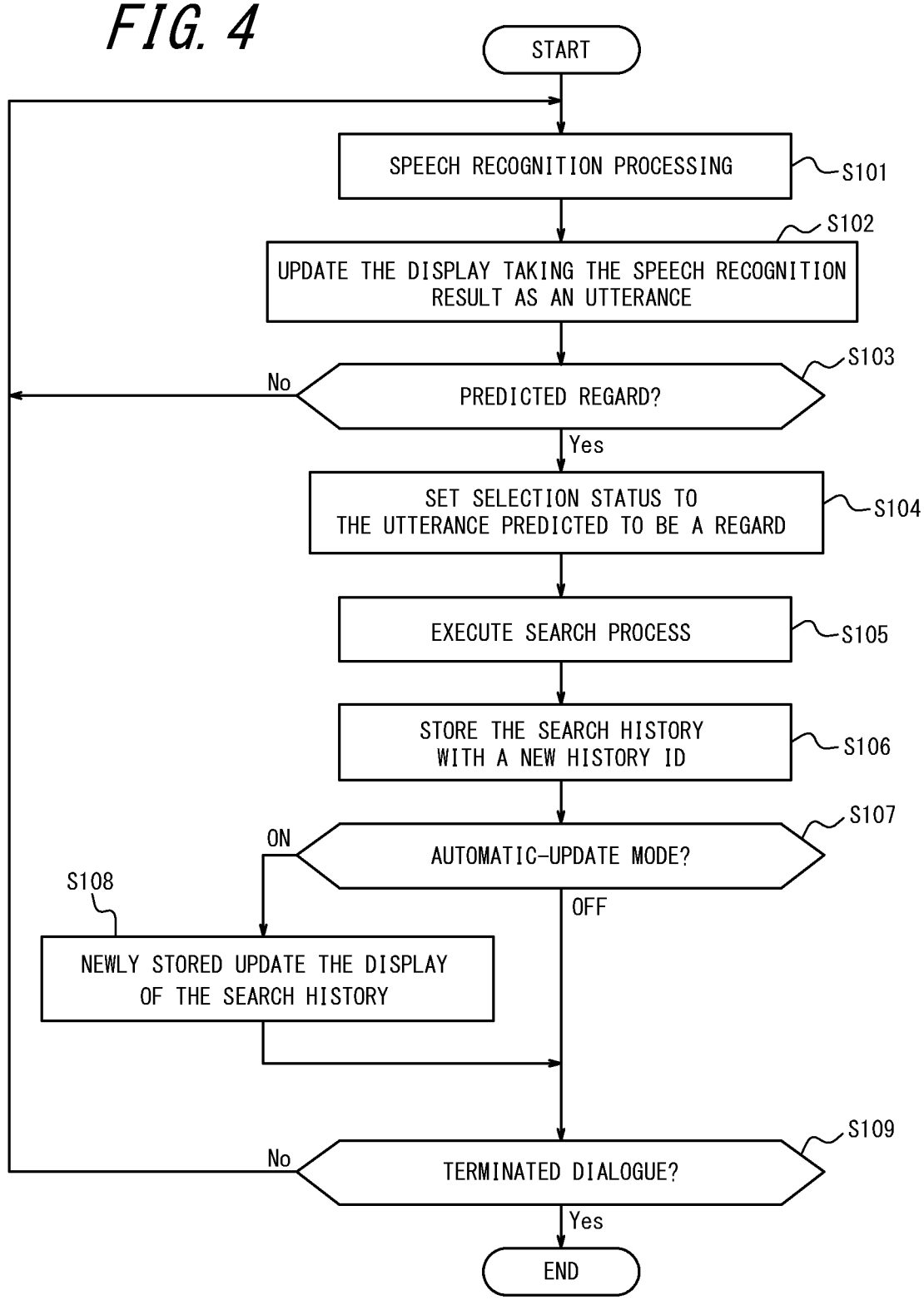
FIG. 4 is a flowchart showing an example of a search result display method according to the first embodiment.

Next, a search result display method by the search result display device 1 will be explained. FIG. 4 is a flowchart showing an example of the search result display method.

First, the voice of the customer and the service person are each inputted in different channels, and speech recognition processing is performed by the speech recognition unit 11 for each of the voices of the customer and the service person (Step S101). Once speech recognition is performed on the speech recognition units, the process proceeds to Step S102.

Next the speech recognition result is set as an utterance and the display is updated by the display 14. Then, the speech recognition result generated at Step S101 is analyzed by the regard prediction unit 12, and the regard of the customer is predicted (Step S103). In a case in which the regard could not be predicted (Step S103—No), the process returns to Step S101, and regard prediction is performed on the next speech recognition result. Then, at the point in which the regard has been predicted (Step S103—Yes), the utterance predicted as the regard is set to a selection status (Step S104), and a search process is executed (Step S105).

Figure 5:
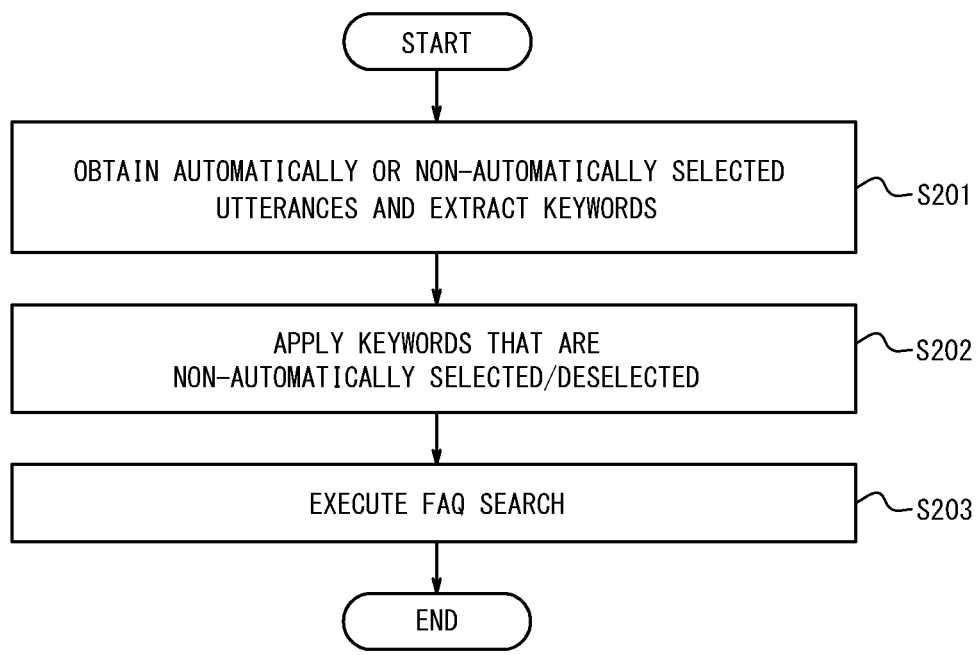
FIG. 5 is a flowchart showing an example of a search process in the search result display method according to the first embodiment.

FIG. 5 is a flowchart showing an example of the search process. The utterance that has been automatically/non-automatically selected is obtained by the keyword extraction unit 17, and keywords are extracted (Step S201). Next, the selected/deselected keywords that have been non-automatically selected are applied by the keyword operation applier 18 (Step S202). Then, the search query is generated by the search instruction unit 15, and the FAQ search is executed using the search device 2 (Step S203). Here, for the process for executing the FAQ search (Step S203) a configuration that would, for a search query, output a desired document as the search result is sufficient, and a learned model or a learned classifier that take a generated search query as an input and output a document corresponding to the search query as a result can be used.

The display controller 13 obtains the search result from the search device 2, appends a new history ID, and stores the search history in the storage 16 (Step S106). Then, determination of the automatic update mode is performed (Step S107) and, in a case in which automatic update mode is off, dialogue termination determination is performed (Step S109). In a case in which automatic update mode is on, the display controller 13 causes the display 14 to display the newly stored search history (utterance or keyword selection status, search result, scroll position, etc.) (Step S108) and, after that, the dialogue termination determination is performed (Step S109). Until the dialogue between the customer and the service person terminates, the search result display device 1 performs the abovementioned process in real-time.

Figure 6:
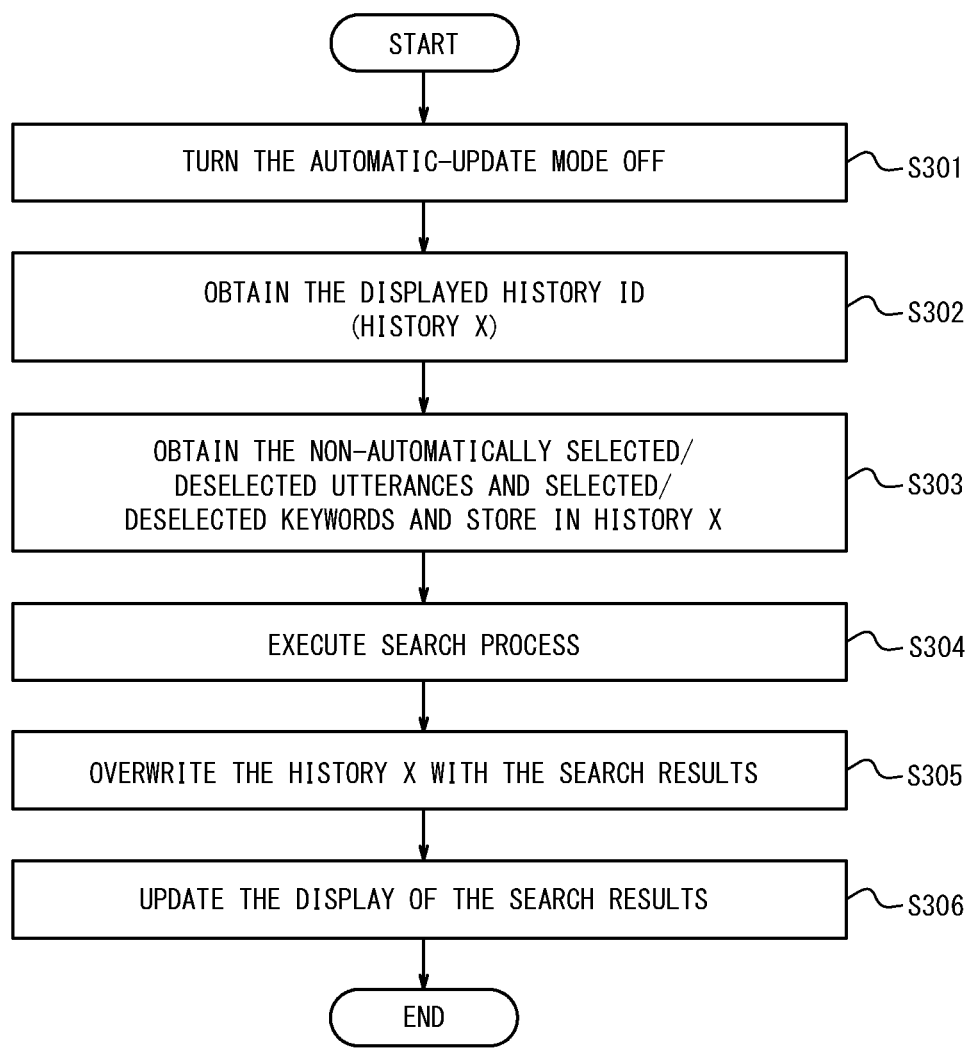
FIG. 6 is a flowchart showing an example of a non-automatic search process in the search result display method according to the first embodiment.

FIG. 6 is a flowchart showing an example of a non-automatic search process. In a case in which a non-automatic search is performed, the display controller 13 turns the automatic update mode to off (Step S301), and the history ID of the display content history (for this case, to be referred to as history X) is obtained (Step S302). Next, the display controller 13 obtains non-automatically , the selected/deselected utterances and the selected/deselected keywords, and these are stored in the history X (Step S303). Next, the search process is executed (Step S304). The processing content of Step S304 is as shown in FIG. 5. Then, the display controller 13 overwrites the search result obtained from the search device 2 with the history X (Step S305), and the display 14 updates the display of the search result (Step S306).

Figure 7:
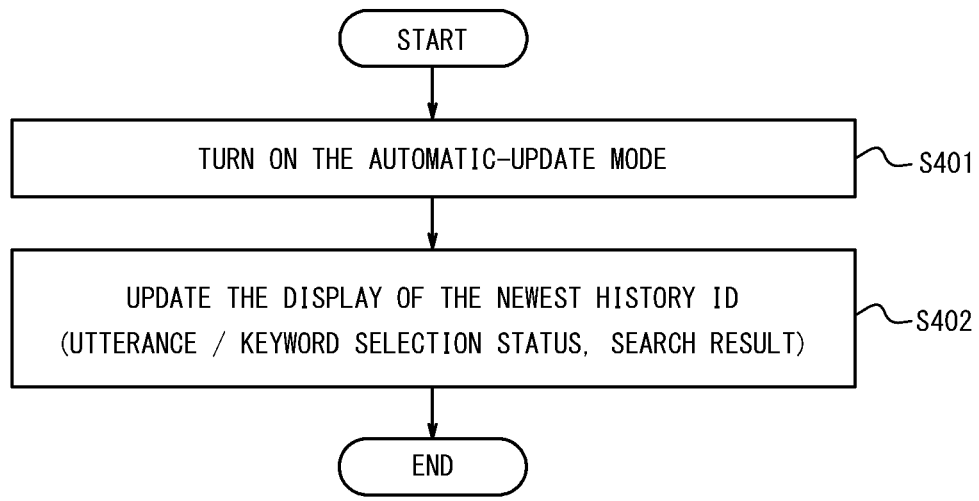
FIG. 7 is a flowchart showing an example of a process when automatic update mode on is instructed in the search result display method according to the first embodiment.

FIG. 7 is a flowchart showing an example of a process in which an automatic update-mode-on instruction is given. In a case in which the automatic update-mode-on instruction is given, the display controller 13 turns on the automatic update mode (Step S401), and the display 14 updates the display of the history to which the newest history ID has been appended (the selection status of the utterance/keyword and the search result) (Step S402). That is, in the dialogue with the customer added to the utterance display 141, the search result of the document corresponding to the newest utterance corresponding to a regard utterance or a regard confirmation utterance is displayed. This search result is the latest (newest) search result stored in the storage 16. Moreover, the search result to be displayed at the time of resumption of the automatic update display may be arbitrarily designated.

As has been demonstrated, in a case in which the service person performs an operation, the display controller 13 prioritizes the non-automatic search over the automatic search. That is, when a manual operation is performed, the display controller 13 stops display of the FAQ obtained via automatic search and, until a manual automatic update-resumption instruction is given, the FAQ obtained by the non-automatic search is displayed (i.e. the automatic update-off mode is invoked). Thereafter, when manual an automatic update-resumption instruction is given, the automatic update-on mode is invoked, and the display is instantly switched to a display of the FAQ based on the newest automatic search result.

Moreover, a computer can be used to function as the abovementioned search result display device 1. For this kind of computer, a program having instructions for realizing the processing content of the respective functions (e.g. the functions of the speech recognition unit 11, the regard prediction unit 12, the display controller 13, the search instruction unit 15, the keyword extraction unit 17, and the keyword operation applier 18) of the search result display device 1 can be saved within the database of that computer. This can be realized by causing the CPU of this computer to read out this program for execution.

Further, the program may be recorded on a computer readable medium. By using a computer readable medium, installation on a computer is possible. Here, a computer readable medium on which the program is recorded may be a non-transitory recording medium. Though the non-transitory recording medium is not particularly limited, it may be, for example, a recording medium such as a CD-ROM and/or a DVD-ROM etc.

As has been explained above, in the present invention, a regard of the customer is predicted from the speech recognition result, a FAQ corresponding to the regard stored in the database 21 is searched, and displayed by the display 14, and in a case in which the service person designates a search query, a FAQ corresponding to the search query stored in the database 21 is searched, and displayed by the display 14.

Thus, according to the invention, not only FAQs based on automatic searches, but also FAQs based on instructions of the service person may be displayed. Further, because consistency between the User Interfaces (UI) for the automatic search and the non-automatic search is assured and a non-automatic search can be performed even during the execution of an automatic search, the service person can readily perform operations for a FAQ search instruction, and the operational burden can be reduced. Further, with regard to the service person, because the search result of the FAQ can be provided without requiring complicated operations, a service person not skilled in terminal operation would still be able to perform servicing duties. If the scene is a call center, the time until a trainee is deployed can be shortened.

Further, in a case in which the service person performs a manual search operation, in a period until the service person gives a search result automatic update instruction, only FAQs corresponding to the operation will be displayed as the FAQs, and thus the operations of the service person will be prioritized, and the service person need not be distracted by unintentional system-side form updates.

Further, until the dialogue between the customer and the service person terminates, the regard prediction unit 12 continuously performs prediction of the regard, the display 14 displays the FAQ corresponding to the regard, and the search result can be swiftly displayed without any operation. As the time expended in doing a manual search is reduced, in effect, the servicing time is also reduced. Further, by causing the display 14 to display the automatic search result in a timely manner according to the servicing status, wasteful non-automatic searches can be prevented.

Further, in the present invention, the display 14 can also display, in a selectable manner, focused keywords and related keywords related to the question items. Thus, the service person refine the question items by engaging in a simple operation of selecting only the necessary words, from the focused keywords and related keywords, and even if the FAQ obtained by the automatic search is wrong, the needed search result can be obtained by easy operation.

Second Embodiment

Figure 8:
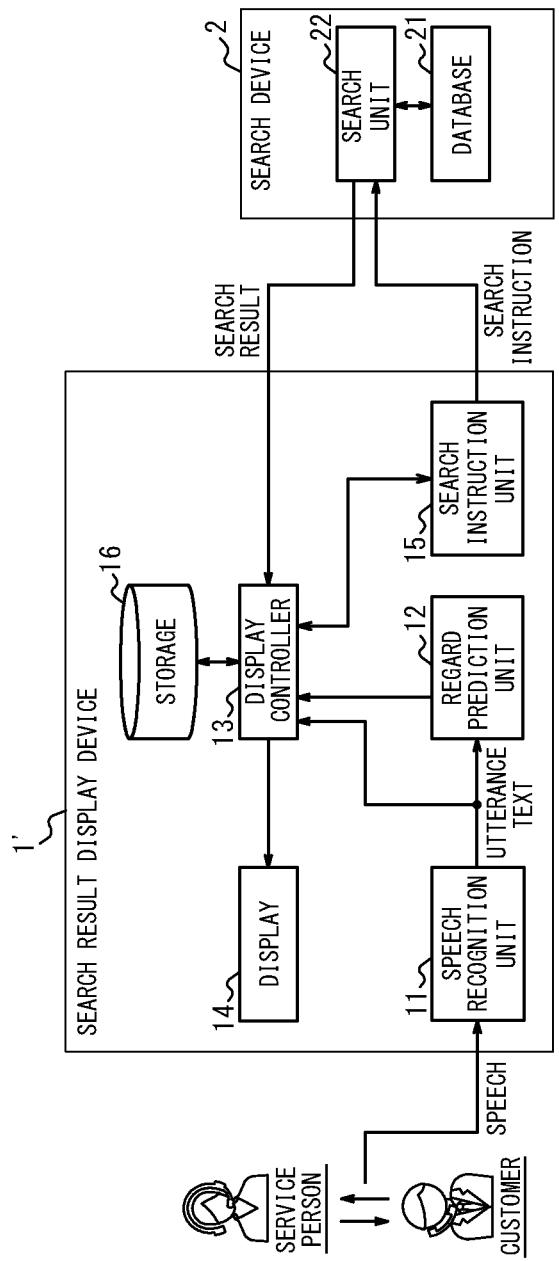
FIG. 8 is a block diagram of an example configuration of a search result display device according to a second embodiment.

Next, the second embodiment will be explained with reference to FIG. 8. FIG. 8 is a block diagram showing an example configuration of a search result display device 1' according to the second embodiment. As shown in FIG. 8, the search result display device 1' comprises the speech recognition unit 11, the regard prediction unit 12, the display controller 13, the display 14, the search instruction unit 15, and the storage 16. That is, in comparison with the search result display device 1 of the first embodiment, the search result display device 1' differs in that it lacks the keyword extraction unit 17 and the keyword operation applier 18.

The speech recognition unit 11, in a similar manner to the first embodiment, performs speech recognition processing for the voices of the customer and the service person, and utterance texts are generated by speech recognition unit, and outputted to the regard prediction unit 12 and the display controller 13.

The regard prediction unit 12, in a similar manner to the first embodiment, predicts the regard of the customer by estimating regard utterances and the regard confirmation utterances from the utterance text. For example, the regard prediction unit 12 predicts, by speech recognition unit, whether the speech recognition result inputted from the speech recognition unit 11 is a regard utterance or a regard confirmation utterance, and the regard prediction result is outputted to the display controller 13 and stored in the storage 16.

In the present embodiment, the search instruction unit 15 obtains from the regard predicted by the regard prediction unit 12 the storage 16. Then, the search instruction unit 15 sets the regard, as-is, as the search query, the search query is outputted to the display controller 13, and a FAQ search instruction including that search query is transmitted to the search device 2.

The search unit 22 performs a natural language search taking the regard (a string based on the regard utterance and the regard confirmation utterance) as the search query. Here, a natural language search is not a search process in which keywords are extracted from the sentence but is a search process in which the sentence itself is set as the search query. In a natural language search, it becomes possible to perform a search while taking into account the dependency of the clauses that would be lost if only keywords were used. Thus, similar to what is disclosed in Japanese Patent No. 6,433,937, the search unit 22 can use clauses that are the components of the clause dependency to calculate metrics such as the degree of similarity of the clauses according to the clause vectors and the degree of similarity among the clause dependencies according to the clause dependency vectors, and by doing so the search accuracy can be improved. Further, in order to further increase the search accuracy, the search unit 22 can perform the likes of: deletion of the words determined to be unnecessary for the search (e.g. words frequently occurring in the FAQ and words that cause a failed search) from the natural language sentence which is the search query received from the search instruction unit 15, wherein the lack of necessity is determined based on the likes of FAQ stored in the database 21, externally conferred words, and word-statistical-information; and addition or substitution, to the search query, of words determined to be necessary for the search (e.g. equivalent terms and synonyms used in the FAQ), to modify the natural language sentence which is the search query received in accordance with the FAQ stored in the database 21, and then a search may be performed using the natural language sentence which is the modified search query, and this process may be performed based on the word-statistical-information that the search instruction unit 15 received from the search unit 22.

The display controller 13 causes the display 14 to display the utterances of the customer and the service person and the FAQ being the search result. Though a specific example of the display form of the display 14 has been given in FIG. 2, a keyword display 142 is not provided in the present embodiment. Other aspects of the display 14 are as explained in relation to the first embodiment. Alternatively, in addition to the utterances of the customer and the service person, and the FAQ which is the search result, the display controller 13 can cause the search query, that the search device 2 has been instructed to search, to be displayed. Alternatively, in order to know the search query actually used by the service person for the search, instead of the search query of the search instruction, the display controller 13 can obtain the search query actually used by the search device 2 along with the search result, and can cause the display 14 to display it instead of the search query of the search instruction. In this case, the display 14 can have a search query display for displaying the search query in the keyword display 142, or it can have a search query display for displaying the search query in lieu of the keyword display 142.

In a case in which the service person caused selection or deselection of the utterance, the utterance selected or deselected (selected/deselected utterance) by the service person is stored in storage 16. Then, the display controller 13 obtains the question items and the FAQ for said question items that correspond to the search query to which the selected/deselected utterances from the database 21, and causes the display 14 to display these until a search result automatic update instruction is given by the service person.

For example, in a case in which an utterance is already selected in the display 14 and the service person has further selected another utterance, the search instruction unit 15 concatenates the already selected utterance with the newly selected utterance to generate a search query of a single natural language sentence. Further, in a case in which a plurality of utterances are already selected in the display 14 and the service person has released the selection of a part of the selected utterances, the search instruction unit 15 removes the released utterances and concatenates the selected utterances to generate a search query of a single natural language sentence. Further, in a case in which the service person has clicked the search target utterance clear button 150 of FIG. 2, all the selected utterances are released and the search instruction unit 15 sets the search query to null. In a case in which the service person, after clicking on the search target utterance clear button 150, again selects one utterance, the search instruction unit 15 makes that utterance the search query. Further, in a case in which the service person has made a plurality of successive clicks to simultaneously select a plurality of utterances, the search instruction unit 15 concatenates all the selected utterances to generate a search query of a single natural language sentence.

Moreover, a computer can be used to function as the abovementioned search result display device 1'. For this kind of computer, a program having instructions for realizing the processing content of the respective functions (e.g. the functions of speech recognition unit 11, the regard prediction unit 12, the display controller 13, and the search instruction unit 15) of the search result display device 1' can be saved within the database of that computer. This can be realized by causing the CPU of this computer to read out this program for execution.

Further, the program may be recorded on a computer readable medium. By using a computer readable medium, installation on a computer is possible. Here, a computer readable medium on which the program is recorded may be a non-transitory recording medium. Though the non-transitory recording medium is not particularly limited, it may be, for example, a recording medium such as a CD-ROM and/or a DVD-ROM etc.

Although the above embodiments have been described as typical examples, it will be evident to the skilled person that many modifications and substitutions are possible within the spirit and scope of the present invention. Therefore, the present invention should not be construed as being limited by the above embodiments, and various changes and modifications can be made without departing from the claims. For example, it is possible to combine a plurality of constituent blocks described in the configuration diagram of the embodiment into one, or to divide one constituent block. Further, though the present embodiment takes FAQs as the search target, the search target needs not be limited to FAQs, and, for example, may include explanatory leaflets, handbooks, pamphlets, and the like.

REFERENCE SIGNS LIST

1,1 search result display device
2 search device
11 speech recognition unit
12 regard prediction unit
13 display controller
14 display
15 search instruction unit
16 storage
17 keyword extraction unit
18 keyword operation applier
21 database
22 search unit
141 utterance display
142 keyword display
143 search result display
144 focused keyword display
145 related keyword display
146 display mode console
147 search history console
148 utterance text additional input interface
149 dialogue status display
150 clear button for search target utterance

The invention claimed is:
1. A search result display device comprising a processor configured to execute a method using a database in which documents are stored for displaying a search result of the documents to assist a service person in a dialogue with a customer, comprising:
receiving as input an utterance text, wherein the utterance text is a part of utterances associated with the dialogue between the customer and the service person;
automatically predicting, from the utterance text, a subject matter associated with the customer in the dialogue;
extracting a keyword from the subject matter associated with the customer in the dialogue;
displaying a combination of the utterance text and a first search result to the service person during the dialogue, wherein the first search result represents a search result obtained from the database based on a match with the keyword as a search query, wherein the keyword is extracted from the subject matter predicted in real-time during the dialogue, and wherein the first search result is automatically updated in real-time according to a subsequently extracted keyword from a subsequently predicted subject matter; and
when a text string in the utterance text or one or more keywords extracted from the utterance text is specified by the service person or when a text including the text string is input by the service person:
replacing the displayed first search result with a second search result and maintaining display of the second search result until further receiving a subsequent instruction from the service person for resuming an automatic update of the display, wherein the second search result represents a search result obtained from the database based on a match with the test string or the keyword specified by the service person or the text input by the service person:
storing in a storage the first search result appended a history ID each time the first search result is automatically updated in real-time as the dialogue continues while maintaining the display of the second search result; and
receiving the subsequent instruction for resuming the automatic update of the display:
in response to the receiving the subsequent instruction for resuming, replacing the displayed second search result with the first search result appended a latest history ID;

receiving the subsequent instructions for displaying a search history based on a past search history; and in response to the receiving the subsequent instruction for the displaying, replacing the displayed first search result appended in the latest history ID with the first search result appended a history ID corresponding to the search history.

2. The search result display device according to claim 1, the processor further configured to execute a method comprising:

repeatably predicting the subject matter until the dialogue between the customer and the service person terminates; and causing, when the service person has given the subsequent instruction for resuming an automatic update of the display, display of a document corresponding to a subject matter last predicted.

3. The search result display device according to claim 1, further comprising a storage for storing the search query and a first history of the search result searched based on the search query, wherein when the text string has been designated by the service person, the storage overwrites the first history with the text string and a second history of a search result based on the text string.

4. The search result display device according to claim 1, wherein the processor causes display of the keyword in a selectable manner.

5. The search result display device according to claim 1, wherein the text string includes an utterance selected from the displayed utterance text or the displayed text string selected from the keyword.

6. A search result display system comprising a processor configured to execute a method using a database in which documents are stored for displaying a search result of the documents to assist a service person in a dialogue with a customer, comprising:

receiving as input an utterance text, wherein the utterance text is a part of utterances associated with the dialogue between the customer and the service person;

automatically predicting, from the utterance text, a subject matter associated with the customer in the dialogue;

extracting a keyword from the subject matter associated with the customer in the dialogue;

displaying a combination of the utterance text and a first search result to the service person during the dialogue, wherein the first search result represents a search result obtained from the database based on a match with the keyword as a search query, wherein the keyword is extracted from the subject matter predicted in real-time during the dialogue, and wherein the first search result is automatically updated in real-time according to a subsequently extracted keyword from a subsequently predicted subject matter; and when a text string in the utterance text or one or more keywords extracted from the utterance text is specified by the service person or when a text including the text string is input by the service person:

replacing the displayed first search result with a second search result and maintaining display of the second search result until further receiving a subsequent instruction from the service person for resuming an automatic update of the display, wherein the second search result represents a search result obtained from the database based on a match with the text string or the keyword specified by the service person or the text input by the service person;

storing in a storage the first search result appended a history ID each time the first search result is automatically updated in real-time as the dialogue continues while maintaining the display of the second search result;

receiving the subsequent instruction for resuming the automatic update of the display;

in response to the receiving the subsequent instruction for resuming, replacing the displayed second search result with the first search result appended a latest history ID;

receiving the subsequent instructions for displaying a search history based on a past search history; and in response to the receiving the subsequent instruction for the displaying, replacing the displayed first search result appended in the latest history ID with the first search result appended a history ID corresponding to the search history.

7. A non-transitory, computer-readable medium having instructions stored thereon causing the performance of the steps for search result display method in a search result display device configured to use a database in which documents are stored to display a search result of the documents, comprising:

a receiving step for receiving as input an utterance text, wherein the utterance text is a part of utterances associated with the dialogue between the customer and the service person;

a predicting step for automatically predicting, from the utterance text, a subject matter associated with the customer in the dialogue;

an extraction step for extracting a keyword from the subject matter associated with the customer in the dialogue;

displaying step for displaying a combination of the utterance text and a first search result to the service person during the dialogue, wherein the first search result represents a search result obtained from the database based on a match with the keyword as a search query, wherein the keyword is extracted from the subject matter predicted in real-time during the dialogue, and wherein the first search result is automatically updated in real-time according to a subsequently extracted keyword from a subsequently predicted subject matter; and when a text string in the utterance text or one or more keywords extracted from the utterance text is specified by the service person or when a text including the text string is input by the service person:

the display control step replaces the displayed first search result with the second search result and maintains display of the second search result until further receiving a subsequent instruction from the service person for resuming an automatic update of the display, wherein the second search result represents a search result obtained from the database based on a match with the text string or the keyword specified by the service person or the text input by the service person;

the display control step further comprising:

storing in a storage the first search result appended a history ID each time the first search result is automatically updated in real-time as the dialogue continues while maintaining the display of the second search result appended a latest history ID;

receiving the subsequent instruction for resuming the automatic update of the display;

in response to the receiving the subsequent instruction for the resuming, replacing the displayed second search result with the first search result appended a latest history ID;

receiving the subsequent instructions for displaying a search history based on a past search history; and in response to the receiving the subsequent instruction for the displaying, replacing the displayed first search result appended in the latest history ID with the first search result appended a history ID corresponding to the search history.

8. A search result display method in a search result display device configured to use a database in which documents are stored to display a search result of the documents, the method comprising:

a receiving step for receiving as input an utterance text, wherein the utterance text is a part of utterances associated with the dialogue between the customer and the service person;

a prediction step for automatically predicting, from the utterance text, a subject matter associated with the customer in the dialogue;

an extraction step for extracting a keyword from the subject matter associated with the customer in the dialogue;

a display control step for displaying a combination of the utterance text and a first search result to the service person during the dialogue, wherein the first search result represents a search result obtained from the database based on a match with the keyword as a search query, wherein the keyword is extracted from the subject matter predicted in real-time during the dialogue, and wherein the first search result is automatically updated in real-time according to a subsequently extracted keyword from a subsequently predicted subject matter;

and when a text string in the utterance text or one or more keywords extracted from the utterance text is specified by the service person or when a text including the text string is input by the service person:

the display control step replaces the displayed first search result with a second search result and maintains display of the second search result until further receiving a subsequent instruction from the service person for resuming an automatic update of the display, wherein the second search result represents a search result obtained from the database based on a match with the text string or the keyword specified by the service person or the text input by the service person;

the display control step further comprising:

storing in a storage the first search result appended a history ID each time the first search result is automatically updated in real-time as the dialogue continues while maintaining the display of the second search result appended a latest history ID;

receiving the subsequent instruction for resuming the automatic update of the display;

in response to the receiving the subsequent instruction for the resuming, replacing the displayed second search result with the first search result appended a latent history ID;

receiving the subsequent instructions for displaying a search history based on a past search history; and in response to the receiving the subsequent instruction for the displaying, replacing the displayed first search result appended in the latest history ID with the first search result appended a history ID corresponding to the search history.

* * * * *